United States Patent [19]

O'Nan, Jr. et al.

[11] 4,127,397

[45] Nov. 28, 1978

[54] DISCHARGE APPARATUS FOR FILTER ASSEMBLY FOR RADIOACTIVE CONTAMINANTS

[75] Inventors: Alex O'Nan, Jr.; Jesse M. Goldsmith, both of Louisville, Ky.

[73] Assignee: American Air Filter Company, Inc., Louisville, Ky.

[21] Appl. No.: 814,174

[22] Filed: Jul. 11, 1977

Related U.S. Application Data

[63] Continuation of Ser. No. 617,329, Sep. 29, 1975, abandoned.

[51] Int. Cl.[2] .............................................. B01D 46/30

[52] U.S. Cl. ........................................ 55/479; 55/466; 55/431; 55/DIG. 9; 302/22; 302/59; 222/189; 222/192

[58] Field of Search .................... 55/33, 428, 429–431, 55/466, 474, 479, 512, 515, 516, 518, DIG. 9; 302/22, 52, 57; 222/189, 192, 193

[56] References Cited

U.S. PATENT DOCUMENTS

| | | | |
|---|---|---|---|
| 1,995,292 | 3/1935 | Clark | 55/474 |
| 2,572,862 | 10/1951 | Israel | 55/466 |
| 2,814,531 | 11/1957 | Murray, Jr. | 302/22 |
| 2,941,842 | 6/1960 | Wishaw | 302/52 |
| 3,220,778 | 11/1965 | Aller | 302/52 |
| 3,438,682 | 4/1969 | Mohrhusen | 302/52 |
| 3,619,011 | 11/1971 | Doble | 222/193 |
| 3,815,335 | 6/1974 | Barnebey | 55/474 |
| 3,925,046 | 12/1975 | Hickey et al. | 55/431 |
| 3,964,890 | 6/1976 | Bonn | 55/518 |

OTHER PUBLICATIONS

Staub–Reinhart, Luft vol. 30, No. 5, 5/5/1970, Filter for Purification of Air or Gases, p. 46.

*Primary Examiner*—Bernard Nozick
*Assistant Examiner*—David L. Lacey

[57] ABSTRACT

Discharge apparatus for filter assembly for radioactive contaminants, the filter assembly including a housing with at least one filter bed therein, the discharge apparatus including a first conduit in fluid communication with an outlet from the filter bed, a closed tank in fluid communication with the first conduit and a second conduit, the second conduit being in fluid communication with a vacuum means with a filter element disposed between the tank and the vacuum means. Upon activation of the vacuum means, the vacuum means pneumatically conveys the filter material from the filter bed.

3 Claims, 4 Drawing Figures

DISCHARGE APPARATUS FOR FILTER ASSEMBLY FOR RADIOACTIVE CONTAMINANTS

This is a continuation of co-pending application Ser. No. 617,329, filed Sept. 29, 1975 by Jesse M. Goldsmith and Alex O'Nan, Jr., now abandoned.

BACKGROUND OF THE INVENTION

This invention relates to filters for removal of radioactive contaminants in a fluid stream and more particularly relates to a means for removing filter material from a filter bed.

In recent years, there has been considerable activity in providing filtration equipment for nuclear power facilities. Most designs have included filter beds comprising charcoal filter stainless steel insert trays wherein bed replacement is accomplished by removing the trays and replacing them with new ones. The spent trays are then either disposed of or returned to the manufacturer where they are dismantled and reloaded. Because of the design of the trays, gaskets are generally required to seal each tray to the filter units. However, the gasket seals have proved to be leak sources thereby allowing the escape of radioactive materials in a gas stream. Thus, integral beds permitting on-site charcoal removal and re-loading has been sought with little success.

SUMMARY OF THE INVENTION

In the present invention, it is recognized that it is desirable to provide a means for removing filter material from a filter bed and it is further recognized that it is desirable to provide means for removing filter material from a filter bed without removing the housing or chamber which holds the filter material therein.

The present invention advantageously provides a straightforward arrangement for the operation for removal of filter material from a filter assembly. The present invention further provides a pneumatic conveying device for removing filter material from a filter assembly. The present invention even further provides means for removing contaminated filter material from a filter assembly without exposing personnel to radioactive contamination.

Various other features of the present invention will become obvious to those skilled in the art upon reading the disclosure set fourth hereinafter.

More particularly, the present invention provides in combination with a filter assembly for removal of radioactive contaminants in a fluid stream including a housing with a bottom and a top with a fluid inlet and outlet and at least one filter bed therein in fluid communication with the fluid inlet and outlet, a filter material discharge apparatus comprising a first conduit in fluid communication with the bottom of the housing, a closed tank having an inlet in fluid communication with the first conduit and an outlet in fluid communication with a second conduit inlet, the second conduit having an outlet in fluid communication with a vacuum means with a filter element disposed between the tank and the vacuum means whereby upon actuation of the vacuum means the filter material in the housing is pneumatical conveyed therefrom.

It is to be understood that the description of the examples of the present invention given hereinafter are not by way of limitation. Various modifications within the scope of the present invention will occur to those skilled in the art upon reading the disclosure set forth hereinafter.

Referring to the drawing.

Figure 4:
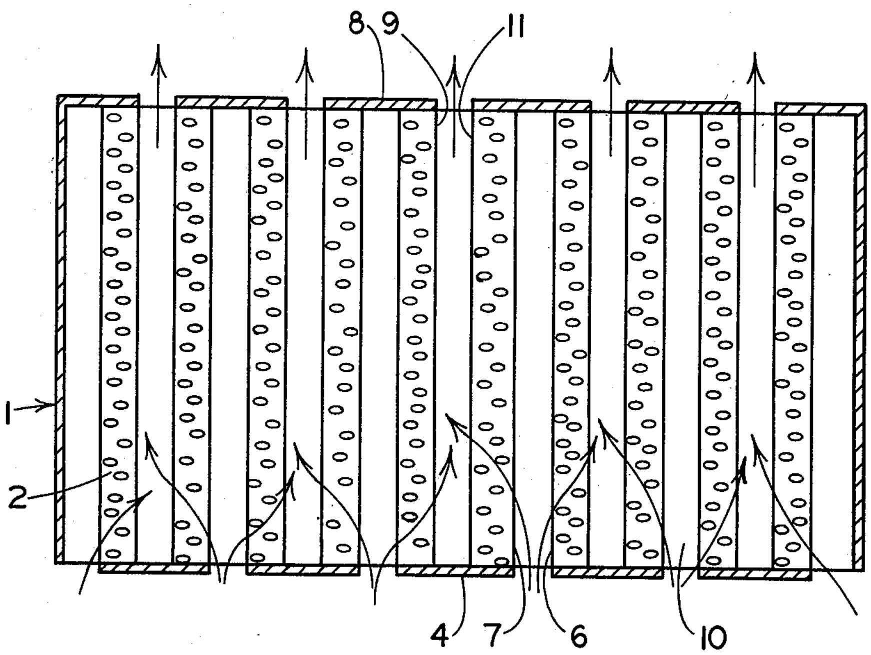

A filter discharge apparatus as shown in the Figures is in fluid communication with a housing 1. Housing 1 includes a plurality of filter beds 2 therein, each filter bed 2 including an impervious front plate member 4 and spaced foraminous side members 6 and 7 with spaced intermediate side members 9 and 11 disposed between the members 6 and 7. The filter beds 2 extend rearwardly and are attached to impervious back plate members 8 which transverse the back of the housing 1 extending vertically from the floor of the housing to a preselected distance above the beds, each back member 8 connecting a pair of filter beds at intermediate side members 9 and 11 thereby leaving a rear opening between the members 9 and 11. Disposed between the filter beds 2 is a plurality of rectangular shaped horizontally extending plate members 10. The plate members 10 are parallel spaced in a vertical position to provide a plurality of channels between the filter beds 2. Contaminating gases pass through the defined channels and then into the filter beds 2 through the spaced foraminous side members 6 and 7 then out through the opening defined between spaced side members 9 and 11 as shown in FIG. 4

The housing 1 has an opening in the bottom thereof and is mounted on top of a tank or hopper 12 which has a mating opening in the top thereof to mate and align with the opening in the bottom of the housing 1. The tank 12 includes downwardly extending converging ends 14 and 16 and downwardly extending converging sides 18 and 20. The hopper 12 is provided with an outwardly extending flange portion 22 which seats upon a plurality of channel supports 24, 26, 28 and 30. The ends 14 and 16 include a pair of aligned opposed openings therein to receive a first conduit 32 and a second conduit 34 therethrough, respectively. The first conduit 32 extends through an opening in the channel member 24 and includes an end 39 open to the environment outside the housing for the filter beds. Conduit 34 extends through an opening in the channel member 24 and is in communication with a tank or drum 36 which has a closed top and bottom.

Figure 1:
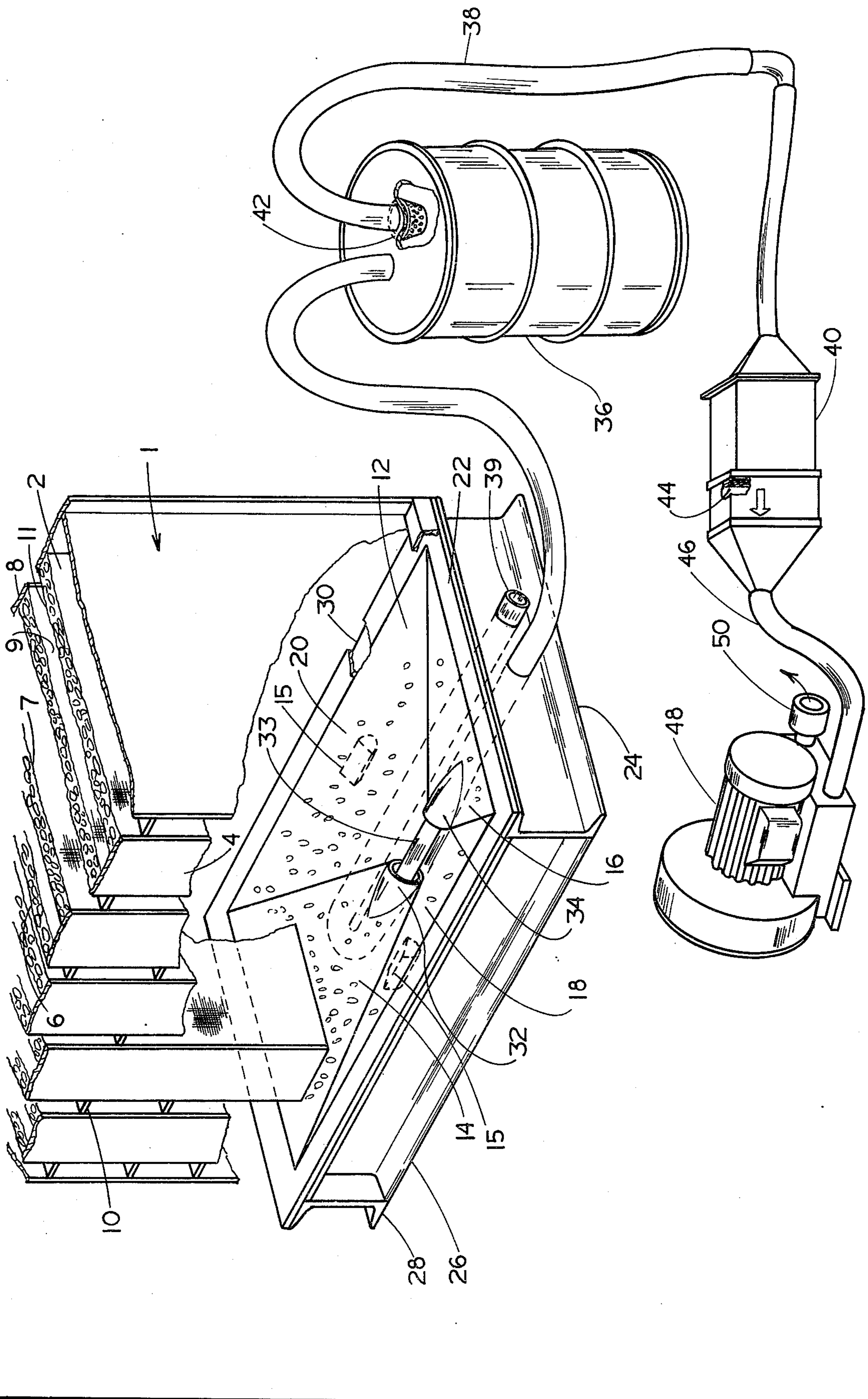
FIG. 1 is a perspective view, partially in cut-away, of a filter discharge apparatus of the present invention.
Figure 2:
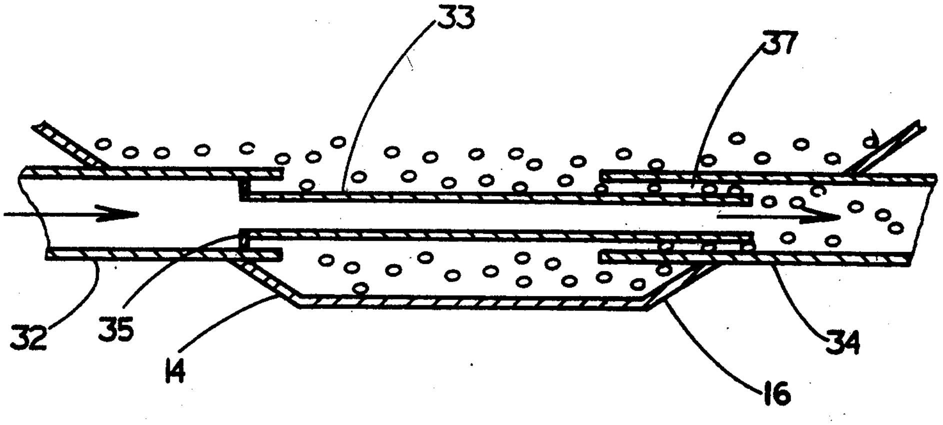
FIG. 2 is an enlarged sectional view of a pneumatic device withdrawing filter material from the discharge tank in FIG. 1.
Figure 3:
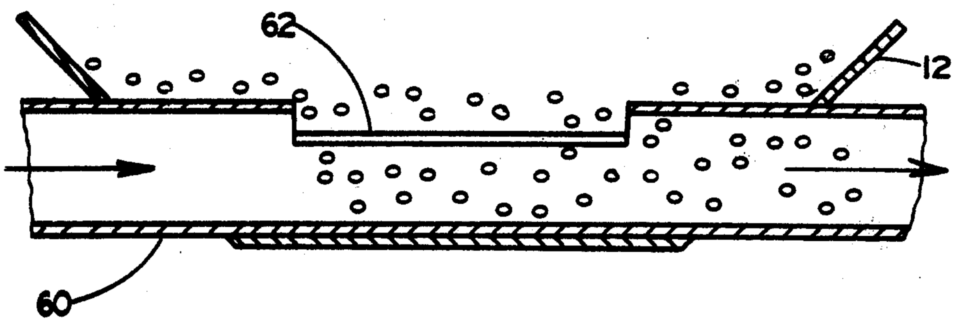
FIG. 3 is an enlarged sectional view of another pneumatic device withdrawing filter material from a discharge and, FIG. 4 is a sectional view of the housing of FIG. 1.

An ejector, as best shown in FIG. 2, is provided to remove filter material from the hopper 12, the ejector shown being disposed to increase the velocity of air entering the hopper through conduit 32. A conduit 33, smaller in diameter than conduit 32 and having one end coaxially disposed within the conduit 32 is provided. The end of the conduit 33 disposed within the conduit 32 is provided with an outwardly extending sealing flange portion 35 which has an outer diameter approximately equal to the inner diameter of the conduit 32 and is attached therein. The opposite end of conduit 33 is coaxially aligned and disposed within the conduit 34 for creating a low pressure zone in the flow through annulus 37 disposed between the outer periphery of conduit 33 and the inner periphery of conduit 34, the low pressure zone being created when vacuum means, to be discussed hereinafter, are activated. However, as shown in FIG. 3, another preferred ejector is shown, FIG. 3 being further discussed hereinafter.

The tank 36 is provided with a second opening in the top thereof to receive one end of a conduit 38 therein, the opposite end of the conduit 38 being in communication with a filter element 40. Filter element 40 will be generally a high efficiency particulate filter 44 but may be a plurality of filters depending upon the amount of particulates to be removed as well as the size of the particles. Attached to the end of the conduit 38 which extends into the tank 38 is a circumferentially extending screen 42 of relatively large porosity. The screen 42 is cup-shaped and is provided to prevent large particles entering the conduit 38 during the adsorbent material discharge operation. Thus, in operation, the drum 36 receives the large particles which are removed from the bottom of the hopper 12.

The outlet side of the filter element 40 is in fluid communication with one end of conduit member 46, the opposite end of conduit member 46 being in flow communication with the suction side of a blower 48, blower 48 being the vacuum means for the system. Discharge from the blower 48 is open to the atmosphere through the opening 50.

Also provided along the sides 18 and 20 are vibrators 15, vibrators 15 being added to keep adsorbent material flowing when the blower 48 is activated and prevent formation of cavities in the area adjacent to the inlet to conduit 16.

In FIG. 3, an ejector shown as a conduit 60 with a portion 62 cut therefrom to provide an opening therein is disposed along the bottom of the hopper 12. Upon activation of the vacuum means discussed hereinbefore, filter material contained in hopper 12 is pulled into the conduit 60 through the opening defined by the cut away portion 62.

In operation utilizing the ejector shown in FIG. 2, upon activation of the blower 48 particulate filter material which is contained within the filter beds 2 and the hopper 12 is pneumatically conveyed to the drum 36 by aspiration through the flow through annulus 37 and into conduit 34, conduit 34 being on the vacuum or low pressure side of the blower 48. The air for the conveying means is brought into the hopper 12 through the conduit 32 which is open to the atmosphere, in combination with conduit 33, the conduit 33 extending a preselected distance into the conduit 34 and creating a low pressure zone at the annulus 37 at the entrance to the conduit 34. Drum 36 which is in fluid communication with the outlet of conduit 34 receives the large particles removed from the hopper 12, the large particles settling to the bottom of the drum 36 with the small particles remaining in the air stream and leaving through conduit 38. However, a pre-filter 42 of relatively large porosity is attached to the inlet to the conduit 38 wherein pre-filter 42 prevents particles of a preselected size from entering the conduit 38. The smaller particles that remain in the air stream leaving the drum 36 are conveyed to the high efficiency particulate filter 44 installed in the filter element housing 40 and are removed therefrom with the clean air stream passing into the blower 48 through the conduit 46 and out into the atmosphere.

It is realized that other filters may be utilized in the conduit system from the hopper to the blower besides the high efficiency particulate filter discussed previously depending upon the size of the filter housing and the adsorbent particulate materials which have been utilized in the filter beds. Furthermore, a plurality of filters, each one removing particles of a given size, may be installed in series in the conduit system in lieu of the single high efficiency particulate filter as discussed.

It will be realized that various changes may be made to the specific embodiment shown and described without departing from the scope and spirit of the present invention.

What is claimed is:

1. A filter assembly for removal of radioactive contaminants in a gas stream and filter material discharge apparatus comprising: a housing with a bottom and a top with a gas inlet in the front wall of said housing and an outlet in the back wall of said housing and a plurality of filter beds having filter material therein in fluid communication with said gas inlet and outlet, said filter beds being in open communication with said bottom of said housing, each of said filter beds including an impervious vertically extending front wall member connected at opposed outer edges to a pair of spaced foraminous outer side members with a pair of spaced intermediate foraminous side members disposed therebetween and connected to said front wall member, said side members extend rearwardly and connect to a pair of impervious vertically extending ball wall members having an outer edge connecting with said intermediate side members, each back wall member connecting a pair of filter beds whereby gases entering said filter beds enter between adjacent outer side members and are laterally squeezed through the filter beds and out through the opening defined by said intermediate side members and opposite edges of adjacent back members; and, said filter material discharge apparatus including a hopper having a pair transversely extending inwardly inclined walls and a pair of longitudinally inwardly inclined walls in communication at their upper extremities with the lower extremities of the outer walls of said housing, said transverse and longitudinal walls terminating at their lower extremities to form a bottom of said hopper, a first conduit in fluid communication with said bottom of said hopper, a closed tank having an inlet in fluid communication with said first conduit and an outlet in fluid communication with an inlet to a second conduit, said second conduit having an outlet in fluid communication with a vacuum means and including a filter element disposed between said tank and said vacuum means, a third conduit having an outlet in fluid communication with said bottom of said hopper axially aligned with and spaced from said first conduit, said third conduit having an inlet open to the atmosphere, and a fourth conduit disposed between said first and said third conduit and co-axial therewith said fourth conduit having a diameter less than the diameter of said first and third conduits and received therein, said fourth conduit having an outwardly extending sealing flange portion communicating in sealing relation with said third conduit thereby creating a low pressure zone adjacent to the inlet to said first conduit with a flow-through annulus being defined between the outer diameter of said fourth conduit and the inner diameter of said first conduit, whereby upon actuation of the vacuum means filter material in said housing is pneumatically conveyed therefrom.

2. The assembly of claim 1 including at least one vibrator disposed on an outer side of said hopper.

3. The assembly of claim 1 including a a screen of large porosity at the outlet of said closed tank which is in fluid communication with the inlet to said second conduit whereby large particles in said conveying gas stream are prevented from entering said second conduit.

* * * * *